US011527797B2

(12) United States Patent
Sun et al.

(10) Patent No.: US 11,527,797 B2
(45) Date of Patent: Dec. 13, 2022

(54) BATTERY PACK

(71) Applicant: Contemporary Amperex Technology Co., Limited, Ningde (CN)

(72) Inventors: Shuo Sun, Ningde (CN); Mingdong Wang, Ningde (CN); Mu Qian, Ningde (CN); Jinqing Ji, Ningde (CN); Min Zeng, Ningde (CN); Shang Li, Ningde (CN); Yang Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 137 days.

(21) Appl. No.: 16/548,394

(22) Filed: Aug. 22, 2019

(65) Prior Publication Data
US 2020/0161611 A1 May 21, 2020

(30) Foreign Application Priority Data

Nov. 16, 2018 (CN) .......................... 201821893738.5

(51) Int. Cl.
*H01M 50/20* (2021.01)
*H01M 10/647* (2014.01)
(Continued)

(52) U.S. Cl.
CPC ......... *H01M 50/20* (2021.01); *H01M 10/647* (2015.04); *H01M 50/10* (2021.01);
(Continued)

(58) Field of Classification Search
CPC ........... H01M 10/4207; H01M 10/647; H01M 2220/10; H01M 2220/20
See application file for complete search history.

(56) References Cited

U.S. PATENT DOCUMENTS 1,459,973 A * 6/1923 Colgan ................. H01M 50/20
180/68.5
2006/0091855 A1 * 5/2006 Seo ...................... H01M 50/112
320/116
(Continued)

FOREIGN PATENT DOCUMENTS

CN 206422136 U 8/2017
CN 206558575 * 10/2017
(Continued)

OTHER PUBLICATIONS

The first examination report for European Application No. 19192937.1, dated Sep. 16, 2020, 5 pages.
(Continued)

*Primary Examiner* — Ula C Ruddock
*Assistant Examiner* — Matthew W Van Oudenaren
(74) *Attorney, Agent, or Firm* — East IP P.C.

(57) ABSTRACT

The present disclosure provides a battery pack, including: battery modules, wherein two or more of the battery modules are arranged side by side in a first direction; and connecting assemblies, wherein each connecting assembly is connected between adjacent two battery modules, and the connecting assembly includes an elastic connecting member being able to elastically deform in the first direction such that the adjacent two battery modules are elastically connected by the connecting assembly. The elastic connecting member can provide a buffer between the adjacent two battery modules. In the case that one of the adjacent two battery modules suffers a force, the elastic connecting member can absorb a force from this battery module, to prevent the adjacent two battery modules from interacting with each other when suffering the force, and avoid a safety accident caused by the interaction between the two battery modules connected to each other.

16 Claims, 8 Drawing Sheets

(51) Int. Cl.
    *H01M 50/10*     (2021.01)
    *H01M 10/625*     (2014.01)
    *H01M 50/242*     (2021.01)
    *H01M 50/204*     (2021.01)

(52) U.S. Cl.
    CPC ........ *H01M 10/625* (2015.04); *H01M 50/204* (2021.01); *H01M 50/242* (2021.01); *H01M 2220/20* (2013.01)

(56) References Cited

U.S. PATENT DOCUMENTS

| | | | |
|---|---|---|---|
| 2013/0029540 A1 | 1/2013 | Tong et al. | |
| 2014/0141298 A1* | 5/2014 | Michelitsch | H01M 10/625 429/71 |
| 2016/0359153 A1* | 12/2016 | Kano | H01M 50/20 |
| 2019/0267682 A1* | 8/2019 | Seo | H01M 10/653 |

FOREIGN PATENT DOCUMENTS

| | | |
|---|---|---|
| CN | 206558575 U | 10/2017 |
| CN | 104900939 B | 3/2018 |
| WO | 2018101079 A1 | 6/2018 |
| WO | 2018186582 A1 | 10/2018 |
| WO | WO2018186582 * | 10/2018 |

OTHER PUBLICATIONS

The extended European search report for European Application No. 19192937.1, dated Mar. 18, 2020, 7 pages.

The Second Office Action for European Application No. 19192937.1, dated Mar. 4, 2021, 7 pages.

The Third Office Action for European Application No. 19192937.1, dated Jul. 21, 2021, 5 pages.

* cited by examiner

BATTERY PACK

CROSS REFERENCE TO RELATED APPLICATION

This application claims priority to Chinese Patent Application No. 201821893738.5, filed on Nov. 16, 2018, which is hereby incorporated by reference in its entirety.

TECHNICAL FIELD

The present disclosure relates to a technical filed of energy storage devices, and particularly relates to a battery pack.

BACKGROUND

With increasing of an electric vehicle's range for single charge, higher and higher requirements are imposed on mechanical service life of the electric vehicle. As the core of the electric vehicle, a battery pack is subjected to more demanding requirements on the mechanical service life. The way of improving the mechanical service life of the battery pack mainly includes improvement of overall structural rigidity of the battery pack and enhancement of strength of a lower case which is a main load-bearing member of the battery pack.

It needs more space and more reinforcing members to increase the strength of the lower case, which goes against high energy density requirements of the battery pack and also increases cost of the case. It is necessary to connect battery modules, which has a highest proportion in a weight of the battery pack, into an integrity to improve the overall structural rigidity of the battery pack. However, the connection members, although improving the overall structural rigidity, inevitably affects the battery modules connected to each other. As a result, an interaction between the battery modules connected to each other may occur when the battery modules suffer a force, which may cause a safety accident.

Therefore, there is a dire need for a new battery pack.

SUMMARY

The embodiments of the present disclosure provide a battery pack, which can prevent a safety accident caused by an interaction between battery modules connected to each other, which occurs when the battery modules suffer a force.

One aspect of the present disclosure provides a battery pack, comprising: battery modules, wherein two or more of the battery modules are arranged side by side in a first direction; and connecting assemblies, wherein each connecting assembly is connected between adjacent two battery modules, and the connecting assembly comprises an elastic connecting member being able to elastically deform in the first direction such that the adjacent two battery modules are elastically connected by the connecting assembly.

According to one aspect of the present disclosure, the connecting assembly further comprises a rigid connecting member for matching with the elastic connecting member, wherein the elastic connecting member is connected between the rigid connecting member and an end plate of at least one battery module of the adjacent two battery modules.

According to one aspect of the present disclosure, the rigid connecting member comprises a base and an adapter portion connected to each other, wherein two side ends of the base opposite to each other in the first direction are respectively connected to two end plates of the adjacent two battery modules, and the adapter portion is disposed on one side of the base in a second direction; the elastic connecting member is configured to surround the adapter portion and a part of an outer surface of the elastic connecting member away from the adapter portion is connected to the two end plates, or the elastic connecting member is connected between the adapter portion and the end plates; and the second direction is configured to intersect with the first direction.

According to one aspect of the present disclosure, the base and the adapter portion are integrally formed, and the rigid connecting member further comprises a weight reduction hole extending through the base and the adapter portion in the second direction.

According to one aspect of the present disclosure, the base is provided with a connecting hole extending through the base in the second direction, the connecting hole is formed into a kidney-shaped hole elongating in the first direction; and the adapter portion is provided with a through hole extending through the adapter portion in the second direction, wherein the base and the adapter portion are connected to each other by means of the connecting hole and the through hole.

According to one aspect of the present disclosure, the two side ends of the base are provided with perforations extending through the base in the second direction, wherein the perforation is formed into a kidney-shaped hole elongating in the first direction, and the base is connected to the end plate by means of the perforations.

According to one aspect of the present disclosure, the connecting assembly further comprises a rigid connecting member for matching with the elastic connecting member, the rigid connecting member is formed as a rigid block extending in the first direction, and the elastic connecting member is formed as an elastic pad; the connecting assembly comprises one or more elastic pads, and in the case that the connecting assembly comprises two or more elastic pads, the two or more elastic pads are respectively disposed on two sides of the rigid block in the first direction, or the two or more elastic pads are disposed on one side of the rigid block in the first direction.

According to one aspect of the present disclosure, the rigid block comprises a first rigid block and a second rigid block continuously arranged in the first direction; the first rigid block has a wedge-shaped longitudinal section, and comprises a first bonding surface and a first contact surface opposite to each other in the first direction; and the second rigid block has a wedge-shaped longitudinal section, and comprises a second bonding surface and a second contact surface opposite to each other in the first direction, wherein the first contact surface and the second contact surface are matched with each other, and the first rigid block and the second rigid block are connected to each other by means of the first contact surface and the second contact surface.

According to one aspect of the present disclosure, the connecting assembly further comprises a rigid connecting member for matching with the elastic connecting member, and the rigid connecting member comprises a side wall and a receiving cavity formed by the side wall, wherein the elastic connecting member is disposed in the receiving cavity.

According to one aspect of the present disclosure, the elastic connecting member comprises a first elastic portion and a second elastic portion, the first elastic portion has a wedge-shaped longitudinal section and comprises a first side wall and a first inclined wall opposite to each other in the first direction, and the second elastic portion has a wedge-shaped longitudinal section and comprises a second side wall and a second inclined wall opposite to each other in the first direction, wherein the first inclined wall and the second inclined wall are matched with each other, and the first elastic portion and the second elastic portion are connected to each other by means of the first inclined wall and the second inclined wall.

The battery pack according to the embodiment of the present disclosure includes the battery module and the connecting assembly for connecting adjacent two battery modules, wherein the connecting assembly includes the elastic connecting member, which can provide a buffer between the adjacent two battery modules. In the case that one of the adjacent two battery modules suffers a force, the elastic connecting member can absorb a force from this battery module, to prevent the adjacent two battery modules from interacting with each other when suffering the force, and avoid a safety accident caused by the interaction between the two battery modules connected to each other.

BRIEF DESCRIPTION OF THE DRAWINGS

Other features, advantages, and technical effects of the present disclosure will become more apparent by reading the following detailed description on non-limiting embodiments with reference to accompanying drawings, wherein the same or similar reference numerals indicate the same or similar features.

Figure 1:
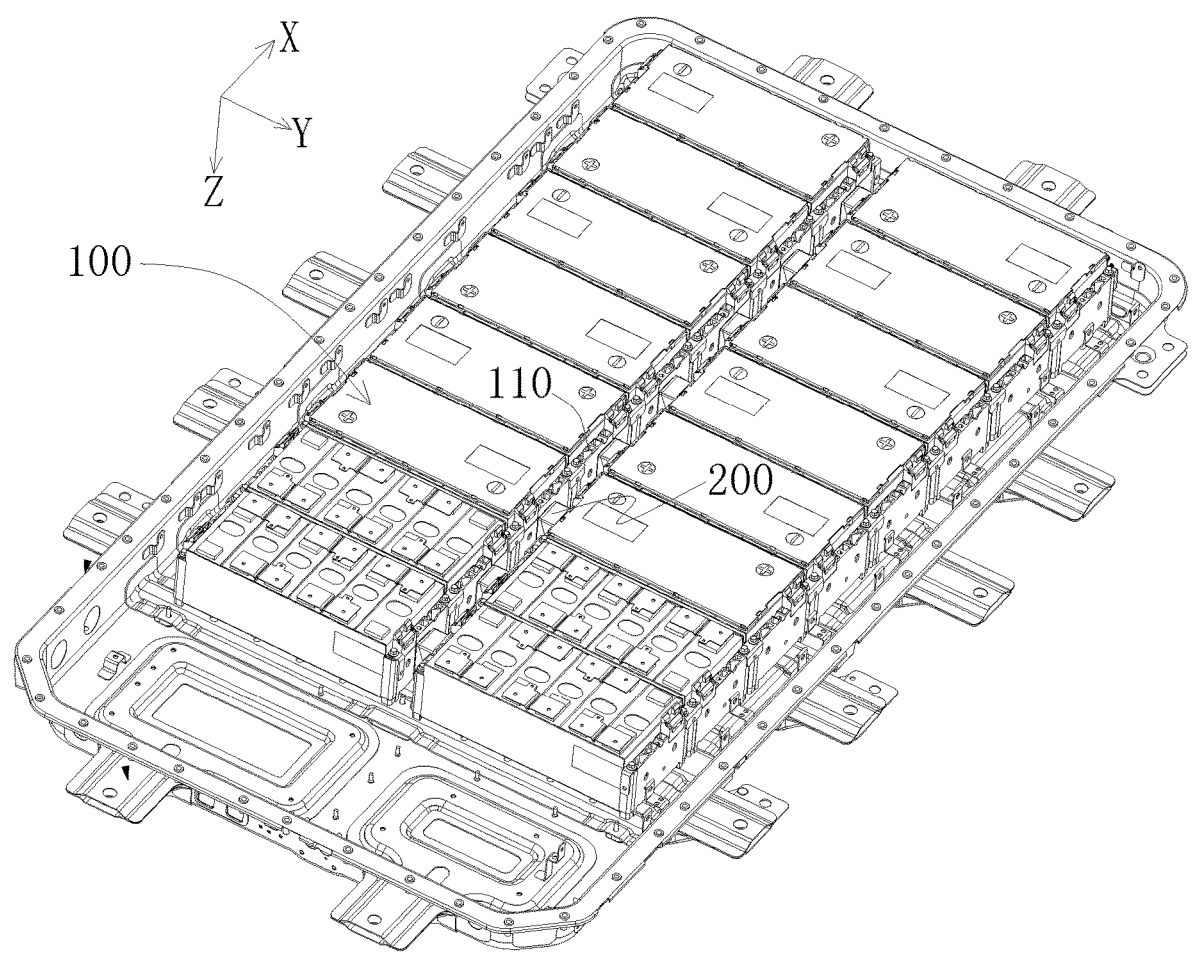
FIG. 1 is a schematic view showing a configuration of a battery pack according to an embodiment of the present disclosure.

DESCRIPTION OF THE REFERENCE NUMERALS 100, battery module;
110, end plate;
200, connecting assembly;
210, a rigid connecting member;
211, base; 211a, connecting hole; 211b, perforation; 212, adapter portion; 212a, through hole; 213, weight reduction hole; 214, first rigid block; 214a, first contact surface; 214b, first bonding surface; 215, second rigid block; 215a, second contact surface; 215b, second bonding surface;
220, elastic connecting member; 221, elastic pad; 222, first elastic portion; 222a, first side wall; 222b, first inclined wall; 223, second elastic portion; 223a, second side wall; 223b, second inclined wall;
Y, first direction; and
Z, second direction.

DETAILED DESCRIPTION

Features and exemplary embodiments of various aspects of the present disclosure will be described in detail below. In the following detailed description, numerous specific details are set forth to provide a full understanding of the present disclosure. However, it shall be apparent to the person skilled in the art that the present disclosure may be implemented without some of the details. The following description of the embodiments is made merely to provide a better understanding of the present disclosure by showing examples of the present disclosure. In the figures and the following description, at least some of well-known structures and techniques are not shown to avoid unnecessarily obscuring the present disclosure. Further, for clarity, size of part of the structure may be exaggerated. Furthermore, features, structures, or characteristics described hereinafter may be combined in any suitable manner into one or more embodiments.

Orientations in the following description refer to directions as shown in the figures, and are not intended to define specific structure of the embodiments of the present disclosure. In the description of the present disclosure, it shall be noted that, unless otherwise clearly stated and defined, the terms such as "installation", "connection" shall be understood broadly, and may be, for example, a fixed connection, a disassemble connection, or an integral connection, and may be direct connection or indirect connection through an intermediate medium. The specific meaning of the above terms in the present disclosure can be understood by the person skilled in the art according to actual circumstance.

In order to better understand the present disclosure, a battery pack according to an embodiment of the present disclosure will be described in detail below with reference to FIGS. 1-15.

Figure 2:
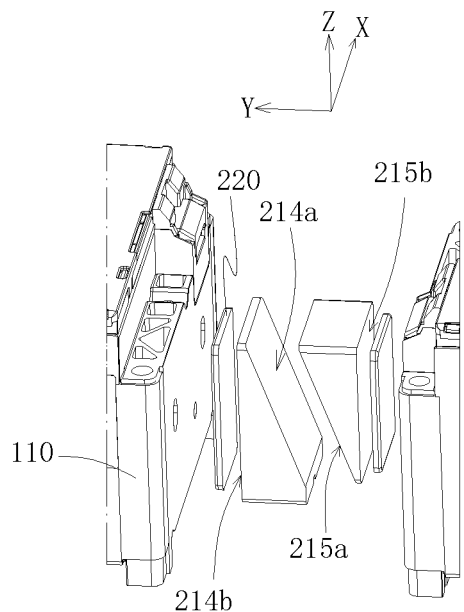
FIG. 2 is a partial isometric view of a battery pack according to an embodiment of the present disclosure.

FIG. 1 shows a battery pack according to an embodiment of the present disclosure, and FIG. 2 is a partial detail view of FIG. 1. The battery pack includes a battery module 100 and a connecting assembly 200, wherein two or more battery modules 100 are arranged side by side in a first direction (Y direction as shown in FIG. 1), and each connecting assembly 200 is connected between adjacent two battery modules 100. The connecting assembly 200 includes an elastic connecting member 220 being able to elastically deform in the first direction, such that the adjacent two battery modules 100 are elastically connected by the connecting assembly 200.

The battery pack according to the embodiment of the present disclosure includes the battery module 100 and the connecting assembly 200 for connecting adjacent two battery modules 100, wherein the connecting assembly 200 includes the elastic connecting member, which can provide a buffer between the adjacent two battery modules 100. In the case that one of the adjacent two battery modules 100 suffers a force, the elastic connecting member 220 can absorb a force from this battery module 100, to prevent the adjacent two battery modules 100 from interacting with each other when suffering the force, and avoid a safety accident caused by the interaction between the two battery modules 100 connected to each other.

In order to satisfy rigidity requirements of the connecting assembly 200, the elastic connecting member 220 is made of a foaming material having a relatively high rigidity, or, the connecting assembly 200 includes a rigid connecting member 210 for matching with the elastic connecting member 220.

In the case that the connecting assembly 200 includes the rigid connecting member 210, the rigid connecting member 210 and the elastic connecting member 220 may match with each other in various manners. For example, the rigid connecting member 210 and the elastic connecting member 220 are stacked one on top of another between the end plates of the adjacent two battery modules 100; or, the rigid connecting member 210 is provided with a receiving cavity and the elastic connecting member 220 is disposed in the receiving cavity.

The rigid connecting member 210 and the elastic connecting member 220 may be stacked one on top of another between the end plates 110 of the adjacent two battery modules 100 in a various manner. For example, the elastic connecting member 220 is located between the rigid connecting member 210 and at least one end plate 110 in the first direction; or, the elastic connecting member 220 and the rigid connecting member 210 are stacked one on top of another in a second direction (Z direction as shown in FIG. 1), and both of the elastic connecting member 220 and the rigid connecting member 210 are connected to the two end plates 110 of the adjacent two battery modules 100. Materials of the elastic connecting member 220 and the rigid connecting member 210 are not particularly limited herein. When the elastic connecting member 220 and the rigid connecting member 210 are configured to match with each other, the elastic connecting member 220 may be made of rubber or foaming material having a certain elasticity. Preferably, the elastic connecting member 220 is made of the rubber having a relatively high hardness, and thus the elastic connecting member 220 can provide a certain support when the battery modules suffer a relative large force and a relative movement between the battery modules occurs. When the connecting assembly 200 does not include the rigid connecting member 210, the elastic connecting member 220 is made of the foaming material having a relatively high hardness.

The rigid connecting member 210 may be made of a metal or alloy having a relatively high rigidity. Preferably, the rigid connecting member 210 is made of an aluminum material, which can reduce a weight of the connecting assembly 200 and increase an energy density of the battery pack under the premise of satisfying the rigidity requirements.

Referring to FIG. 2 to FIG. 5 together, the elastic connecting member 220 may be located between the rigid connecting member 210 and at least one end plate 110 in various manners. In some optional embodiments, the rigid connecting member 210 is formed as a rigid block extending in the Y direction, and the elastic connecting member 220 is formed as an elastic pad 221, which is located between the rigid block and at least one end plate 110 in the Y direction.

Figure 3:
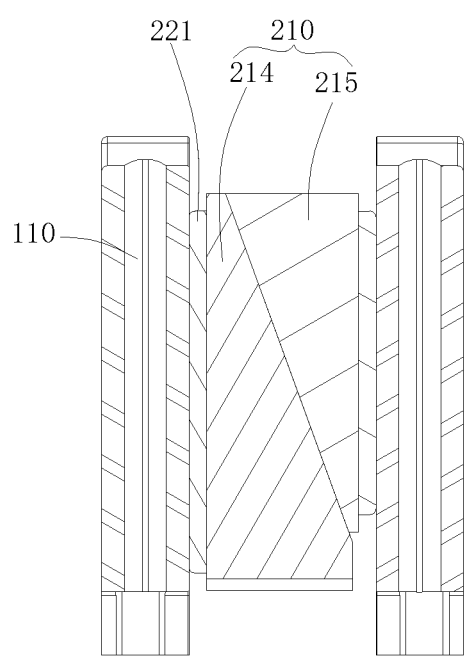
FIG. 3 is a partial cross-sectional view of the battery pack according to the embodiment of the present disclosure.
Figure 4:
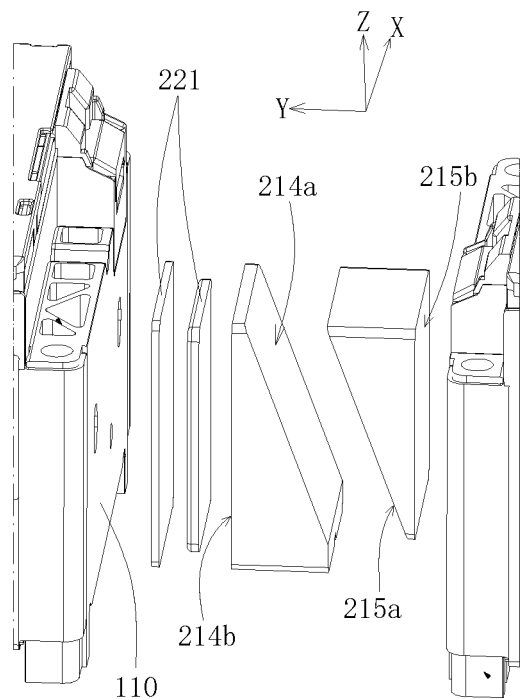
FIG. 4 is a partial isometric view of a battery pack according to a further embodiment of the present disclosure.
Figure 5:
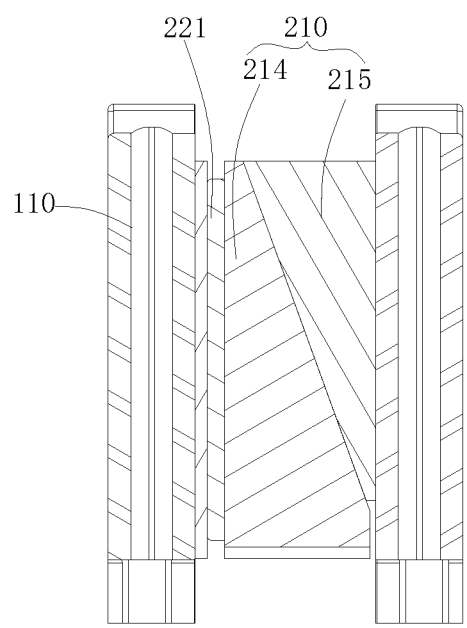
FIG. 5 is a partial cross-sectional view of the battery pack according to the further embodiment of the present disclosure.

The number of the elastic pads 221 is not particularly limited herein, and there may be one or more elastic pads 221. In the case that there are two or more elastic pads 221, as shown in FIG. 2 and FIG. 3, the two or more elastic pads 221 are respectively disposed on two sides of the rigid block in the Y direction, and are respectively located between the rigid block and the end plate 110; or, as shown in FIG. 4 and FIG. 5, the two or more elastic pads 221 are disposed on one side of the rigid block in the Y direction, and are all located between the rigid block and the same end plate 110.

A thickness of the elastic pad 221 and that of the rigid block extending in the Y direction are not particularly limited herein. Preferably, the thickness of the elastic pad 221 is smaller than that of the rigid block. The larger thickness of the rigid block can sufficiently ensure a connection stiffness between the adjacent two battery modules.

A shape and a specific configuration of the rigid block are not particularly limited herein. In some optional embodiments, the rigid block includes a first rigid block 214 and a second rigid block 215, which are continuously arranged in the Y direction. The first rigid block 214 has a wedge-shaped longitudinal section, and includes a first bonding surface 214b and a first contact surface 214a opposite to each other in the first direction. The second rigid block 215 has a wedge-shaped longitudinal section, and includes a second bonding surface 215b and a second contact surface 215a opposite to each other in the first direction. The first contact surface 214a and the second contact surface 215a are matched with each other, and the first rigid block 214 and the second rigid block 215 are connected to each other by means of the first contact surface 214a and a second contact surface 215a.

The longitudinal section of the first rigid block 214 refers to a section of the first rigid block 214 in Y-Z plane as shown in FIG. 2, and the longitudinal section of the second rigid block 215 refers to a section of the second rigid block 215 in the Y-Z plane as shown in FIG. 2.

In these optional embodiments, the longitudinal section of the first rigid block 214 and the longitudinal section of the second rigid block 215 are both wedge-shaped. When a contact area between the first contact surface 214a and the second contact surface 215a changes, an extending width of the entire rigid block in the first direction is changed. Therefore, by changing of the extending width of the rigid block, an assembly error caused by the assembly of the battery modules 100 can be compensated for, thereby an assembly precision of the battery pack can be improved.

In any of the above embodiments, in order to increase a connection strength between the rigid block and the elastic pad 221, the rigid block and the elastic pad 221 can be bonded to each other by a structural adhesive. Meanwhile, when the elastic pad 221 is connected to the end plate 110, the elastic pad 221 and the end plate 110 can be bonded to each other by a structural adhesive. When the rigid block is connected to the end plate 110, the rigid block and the end plate 110 may be bonded to each other by a structural adhesive.

Referring to FIG. 6 to FIG. 9 together, in some other optional embodiments, the elastic connecting member 220 and the rigid connecting member 210 may be stacked one on top of another in a vertical direction in various manners. For example, both of the elastic connecting member 220 and the rigid connecting member 210 are configured to extend in the first direction and are connected to the adjacent two end plates 110.

Alternatively, the rigid connecting member 210 includes a base 211 and an adapter portion 212 connected to each other. Two side ends of the base 211 opposite to each other in the first direction are respectively connected to two end plates 110 of adjacent two battery modules 100, and the adapter portion 212 is disposed on one side of the base 211 in the second direction. The elastic connecting member 220 is configured to surround the adapter portion 212, and a part of an outer surface of the elastic connecting member 220 away from the adapter portion 212 is connected to the two end plates 110. Or, the elastic connecting member 220 is connected between the adapter portion 212 and the end plate 110.

In these optional embodiments, the elastic connecting member 220 is configured to surround the adapter portion 212, or the elastic connecting member 220 is located between the adapter portion 212 and the end plate 110. As such, an extending distance of the elastic connecting member 220 in the first direction can be reduced. Moreover, a part of the elastic connecting member 220 is located between the end plate 110 and the adapter 212, which can increase a stiffness of the entire connecting assembly 200, and also can make the connecting assembly 200 to have a certain buffering effect by means of the elastic connecting member 220.

Figure 8:
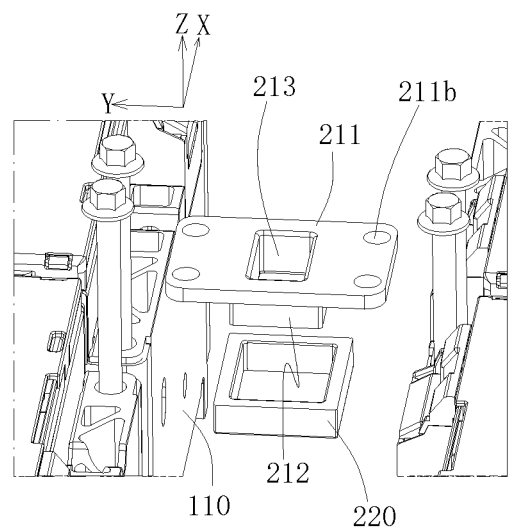
FIG. 8 is a partial isometric view of a battery pack according to another embodiment of the present disclosure.
Figure 9:
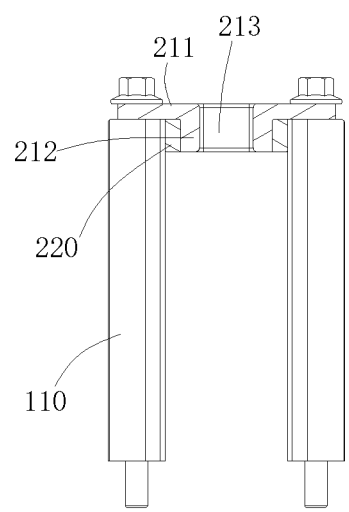
FIG. 9 is a partial cross-sectional view of the battery pack according to the another embodiment of the present disclosure.
Figure 10:
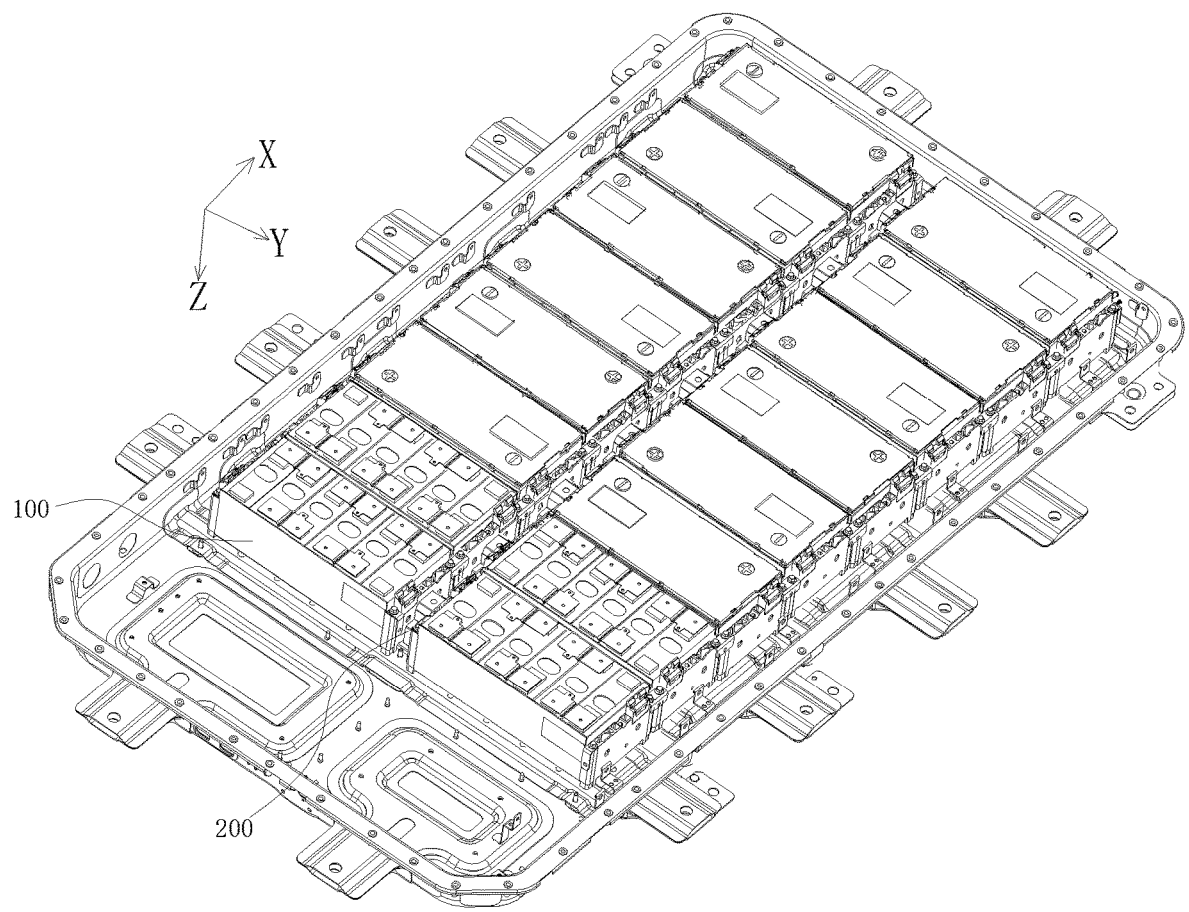
FIG. 10 is a schematic view showing a configuration of a battery pack according to a still another embodiment of the present disclosure.

The base 211 and the adapter portion 212 may be formed integrally or separately. As shown in FIG. 8 and FIG. 9, when the base 211 and the adapter portion 212 are integrally formed, the rigid connecting member 210 further includes a weight reduction hole 213 extending through the base 211 and the adapter portion 212 in the Z direction. Since the weight reduction hole 213 penetrates through both the base 211 and the adapter portion 212 in the Z direction, the weight of the connecting assembly 200 can be effectively reduced and material can be saved.

Figure 6:
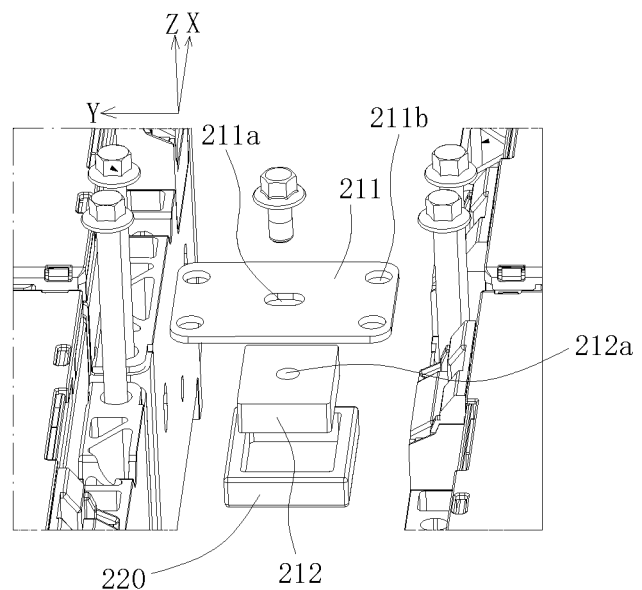
FIG. 6 is a partial isometric view of a battery pack according to a still further embodiment of the present disclosure.
Figure 7:
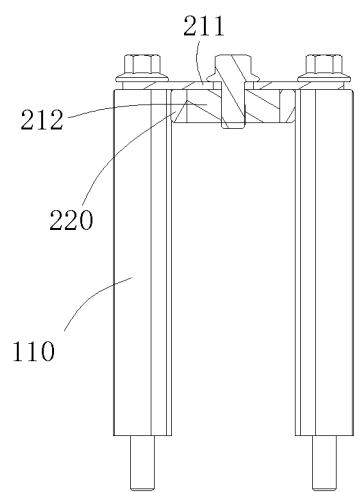
FIG. 7 is a partial cross-sectional view of the battery pack according to the still further embodiment of the present disclosure.

As shown in FIG. 6 and FIG. 7, when the base 211 and the adapter portion 212 are separately formed, the base 211 includes a connecting hole 211a extending through the base 211 in the Z direction, and the adapter portion 212 includes a through hole 212a extending through the adapter portion 212 in the Z direction. The base 211 and the adapter portion 212 are connected to each other by means of the connecting hole 211a and the through hole 212a.

The connecting hole 211a and the through hole 212a may have the same or different apertures. In some optional embodiments, the aperture of the connecting hole 211a and that of the through hole 212a are different, and the connecting hole 211a is formed into a kidney-shaped hole elongating in the Y direction.

In these optional embodiments, the connecting hole 211a is longer in the Y direction. When one of the adjacent two battery modules 100 suffers a force and presses against the elastic connecting member 220, the adapter portion 212 can move in the Y direction with respect to the base 211 by means of the connecting hole 211a to buffer the force. Thus, the connecting assembly 200 can absorb shaking of the battery module 100 caused by the force, and prevent the shaking from being transmitted to the other battery module 100. After the relative positions of the adjacent two battery modules 100 are stabilized, the adapter portion 212 can return to its original position under an elastic force from the elastic connecting member 220.

In some other optional embodiments, the two side ends of the base 211 are provided with perforations 211b extending through the base 211 in the Z direction. Each of the perforation 211b is formed into a kidney-shaped hole elongating in the Y direction, and the base 211 is connected to the end plate 110 by means of the perforations 211b.

In these optional embodiments, the perforation 211b is formed into the kidney-shaped hole, and is longer in the Y direction. Thus, when one of the adjacent two battery modules 100 suffers a force and presses against the elastic connecting member 220, the end plate 110 of the battery module 100 can move in the Y direction with respect to the base 211 by means of the perforations 211b to buffer the force. Therefore, the shaking of the battery module 100 caused by the force can be absorbed by means of the connecting assembly 200, and thus is prevented from being transmitted to the other battery module 100. After the relative positions of the adjacent two battery modules 100 are stabilized, the end plate 110 can return to its original position under an elastic force from the elastic connecting member 220.

Materials of the elastic connecting member 220 and the rigid connecting member 210 are not particularly limited herein, as long as the elastic connecting member 220 and the rigid connecting member 210 can match with each other such that the connecting assembly 200 can satisfy the requirements on the connection stiffness of the battery module 100 and also has a certain buffering effect. For example, the elastic connecting member 220 may be made of a material having a certain elasticity, such as rubber or foaming material, and the rigid connecting member 210 may be made of a material having a certain rigidity, such as metal or alloy.

Thicknesses of the base 211, the adapter portion 212, and the elastic connecting member 220 in the Z direction are not particularly limited herein. Preferably, the thickness of the base 211 is relatively small, thereby saving material and reducing the weight of the connecting assembly 200. The thickness of the adapter portion 212 is the same as that of the elastic connecting member 220, such that the elastic connecting member 220 can be completely attached to the adapter portion 212 without waste of the material of the adapter portion 212.

In any of the above embodiments, the elastic connecting member 220 and the rigid connecting member 210 can be bonded to each other by a structural adhesive. Meanwhile, contact interfaces of the elastic connecting member 220 and the end plate 110 also can be bonded to each other by the structural adhesive.

Referring to FIG. 10 to FIG. 13 together, in still some other optional embodiments, the rigid connecting member 210 includes a receiving cavity in which the elastic connecting member 220 is received, wherein the rigid connecting member 210 includes a side wall and a receiving cavity formed by the side wall, and the elastic connecting member 220 is disposed in the receiving cavity.

The receiving cavity can be formed in various manners. For example, the receiving cavity can be directly enclosed by the side wall of the rigid connecting member 210; or, the receiving cavity is not an enclosed space formed by the side wall, and specifically, the side wall is formed into an annular shape, and the annular rigid connecting member 210 is disposed between adjacent two end plates 110 such that an enclosed receiving space is formed by the rigid connecting member 210 and the end plates 110 together.

Material of the rigid connecting member 210 is not particularly limited herein, and the rigid connecting member 210 may be made of metal or alloy. Material of the elastic connecting member 220 is not particularly limited herein, and the material of the elastic connecting member 220 may be rubber or foaming material.

Preferably, the elastic connecting member 220 is made of the foaming material, and the rigid connecting member 210 further includes an opening provided on the side wall and communicating with the receiving cavity, wherein the foaming material can be filled into the receiving cavity of the rigid connecting member 210 via the opening.

Figure 11:
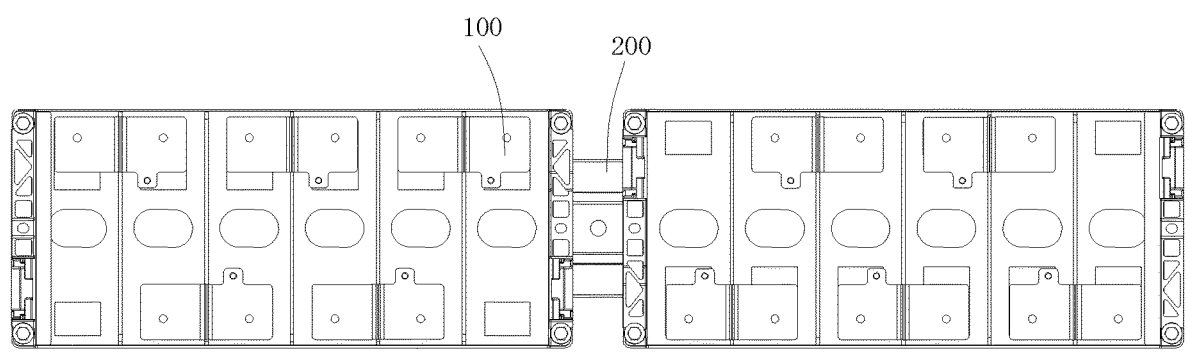
FIG. 11 is a top view of FIG. 10.
Figure 12:
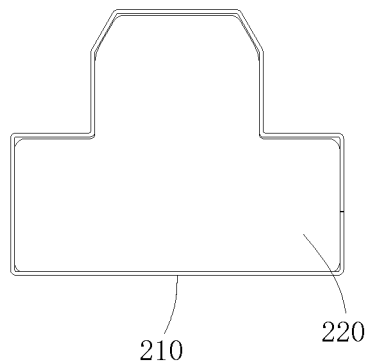
FIG. 12 is a front view of a connection assembly of a battery pack according to another embodiment of the present disclosure.
Figure 13:
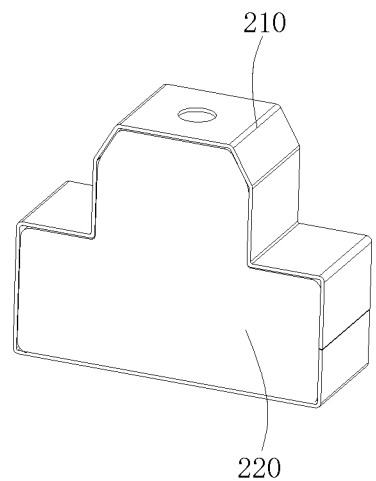
FIG. 13 is a isometric view of the connection assembly of the battery pack according to the another embodiment of the present disclosure.

The rigid connecting member 210 may be formed in various shapes. As shown in FIG. 11 to FIG. 13, the rigid connecting member 210 may be integrally formed, and may have a longitudinal section in a substantially inverted T shape. The rigid connecting member 210 may have a longitudinal section in other shapes, such as a rectangle, a triangle, a circle, and the like.

Figure 14:
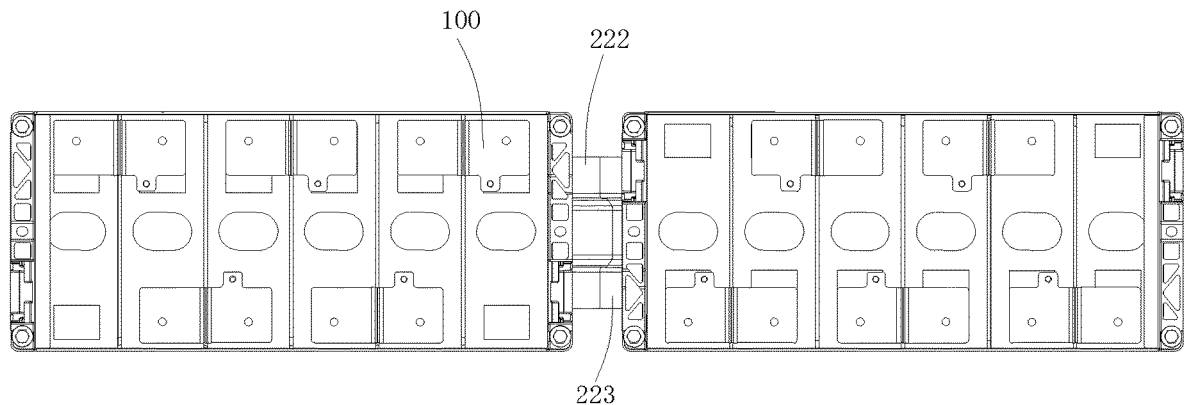
FIG. 14 is a schematic view showing a configuration of a battery pack according to a further embodiment of the present disclosure.
Figure 15:
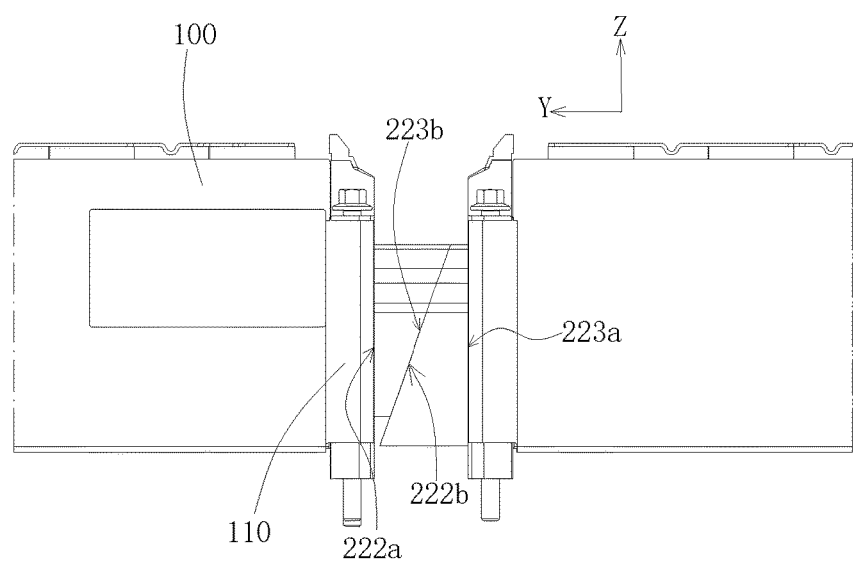
FIG. 15 is a partial schematic view showing a configuration of the battery pack according to the further embodiment of the present disclosure.

In still some other optional embodiments, in the case that the connecting assembly 200 includes only the elastic connecting member 220, as shown in FIG. 14 and FIG. 15, the elastic connecting member 220 includes a first elastic portion 222 and a second elastic portion 223. The first elastic portion 222 has a wedge-shaped longitudinal section, and includes a first side wall 222a and a first inclined wall 222b opposite to each other in the Y direction. The second elastic portion 223 has a wedge-shaped longitudinal section and includes a second side wall 223a and a second inclined wall 223b opposite to each other in the Y direction. The first inclined wall 222b and the second inclined wall 223b are matched with each other, and the first elastic portion 222 and the second elastic portion 223 are connected to each other by means of the first inclined wall 222b and the second inclined wall 223b.

The longitudinal section of the first elastic portion 222 refers to a cross section of the first elastic portion 222 in Y-Z plane as shown in FIG. 14. Similarly, the longitudinal section of the second elastic portion 223 refers to a cross section of the second elastic portion 223 in the Y-Z plane as shown in FIG. 14.

In these optional embodiments, the longitudinal section of the first elastic portion 222 and that of the second elastic portion 223 are both wedge-shaped. When a contact area between the first inclined wall 222b and the second inclined wall 223b changes, an extending width of the entire elastic connecting member 220 in the Y direction changes. Therefore, by means of changing the extending width of the elastic connecting member 220, an assembly error caused by an assembly of the battery module 100 can be compensated for, and an assembly accuracy of the battery pack can be improved.

In any of the above embodiments, the elastic connecting member 220 and the end plate 110 may be bonded to each other by a structural adhesive.

The present disclosure can be implemented in other specific manners without departing from the substantial features. The present embodiments are to be considered in all respects as illustrative and not limiting, and the scope of the present disclosure is defined by the appended claims while not the above description. Moreover, all modifications within the scope of the claims and the equivalents thereof are included within the scope of the present disclosure.

What is claimed is:

1. A battery pack, comprising:
    battery modules, wherein two or more of the battery modules are arranged side by side in a first direction; and
    connecting assemblies, wherein each connecting assembly is connected between adjacent two battery modules, and the connecting assembly comprises an elastic connecting member being able to elastically deform in the first direction such that the adjacent two battery modules are elastically connected by the connecting assembly,
    the connecting assembly further comprises a rigid connecting member for matching with the elastic connecting member, wherein the elastic connecting member is connected between the rigid connecting member and an end plate of at least one battery module of the adjacent two battery modules,
    wherein the elastic connecting member is made of rubber or foaming material, and
    the battery pack further comprises a tray, the battery modules are set on an upper surface of the tray, while the connecting assembly is spaced apart from the upper surface of the tray.

2. The battery pack according to claim 1, wherein,
    the rigid connecting member comprises a base and an adapter portion connected to each other, wherein two side ends of the base opposite to each other in the first direction are respectively connected to two end plates of the adjacent two battery modules, and the adapter portion is disposed on one side of the base in a second direction;
    the elastic connecting member is configured to surround the adapter portion and a part of an outer surface of the elastic connecting member away from the adapter portion is connected to the two end plates; and
    the second direction is configured to intersect with the first direction.

3. The battery pack according to claim 2, wherein,
    the base and the adapter portion are integrally formed, and the rigid connecting member further comprises a weight reduction hole extending through the base and the adapter portion in the second direction.

4. The battery pack according to claim 2, wherein,
    the base is provided with a connecting hole extending through the base in the second direction, the connecting hole is formed into a kidney-shaped hole elongating in the first direction; and
    the adapter portion is provided with a through hole extending through the adapter portion in the second direction,
    wherein the base and the adapter portion are connected to each other by means of the connecting hole and the through hole.

5. The battery pack according to claim 2, wherein,
    the two side ends of the base are provided with perforations extending through the base in the second direction, wherein each perforation is formed into a kidney-shaped hole elongating in the first direction, and the base is connected to the end plate by means of the perforations.

6. The battery pack according to claim 1, wherein,
    the rigid connecting member is formed as a rigid block extending in the first direction, and the elastic connecting member is formed as an elastic pad;
    the connecting assembly comprises one or more elastic pads, and in the case that the connecting assembly comprises two or more elastic pads, the two or more elastic pads are respectively disposed on two sides of the rigid block in the first direction.

7. The battery pack according to claim 6, wherein,
    the rigid block comprises a first rigid block and a second rigid block continuously arranged in the first direction;

the first rigid block has a wedge-shaped longitudinal section, and comprises a first bonding surface and a first contact surface opposite to each other in the first direction; and the second rigid block has a wedge-shaped longitudinal section, and comprises a second bonding surface and a second contact surface opposite to each other in the first direction, wherein the first contact surface and the second contact surface are matched with each other, and the first rigid block and the second rigid block are connected to each other by means of the first contact surface and the second contact surface.

8. The battery pack according to claim 1, wherein, the rigid connecting member comprises a side wall and a receiving cavity formed by the side wall, wherein the elastic connecting member is disposed in the receiving cavity.

9. The battery pack according to claim 1, wherein, the rigid connecting member comprises a base and an adapter portion connected to each other, wherein two side ends of the base opposite to each other in the first direction are respectively connected to two end plates of the adjacent two battery modules, and the adapter portion is disposed on one side of the base in a second direction;

the elastic connecting member is connected between the adapter portion and the end plates; and the second direction is configured to intersect with the first direction.

10. The battery pack according to claim 9, wherein, the base and the adapter portion are integrally formed, and the rigid connecting member further comprises a weight reduction hole extending through the base and the adapter portion in the second direction.

11. The battery pack according to claim 9, wherein, the base is provided with a connecting hole extending through the base in the second direction, the connecting hole is formed into a kidney-shaped hole elongating in the first direction; and the adapter portion is provided with a through hole extending through the adapter portion in the second direction, wherein the base and the adapter portion are connected to each other by means of the connecting hole and the through hole.

12. The battery pack according to claim 9, wherein, the two side ends of the base are provided with perforations extending through the base in the second direction, wherein each perforation is formed into a kidney-shaped hole elongating in the first direction, and the base is connected to the end plate by means of the perforations.

13. The battery pack according to claim 1, wherein, the rigid connecting member is formed as a rigid block extending in the first direction, and the elastic connecting member is formed as an elastic pad;

the connecting assembly comprises one or more elastic pads, and in the case that the connecting assembly comprises two or more elastic pads, the two or more elastic pads are disposed on one side of the rigid block in the first direction.

14. The battery pack according to claim 13, wherein, the rigid block comprises a first rigid block and a second rigid block continuously arranged in the first direction;

the first rigid block has a wedge-shaped longitudinal section, and comprises a first bonding surface and a first contact surface opposite to each other in the first direction; and the second rigid block has a wedge-shaped longitudinal section, and comprises a second bonding surface and a second contact surface opposite to each other in the first direction, wherein the first contact surface and the second contact surface are matched with each other, and the first rigid block and the second rigid block are connected to each other by means of the first contact surface and the second contact surface.

15. A battery pack, comprising:

battery modules, wherein two or more of the battery modules are arranged side by side in a first direction; and connecting assemblies, wherein each connecting assembly is connected between adjacent two battery modules, and the connecting assembly comprises an elastic connecting member being able to elastically deform in the first direction such that the adjacent two battery modules are elastically connected by the connecting assembly, wherein each battery module comprises an end plate having a surface, the elastic connecting member is made of foaming material, and is directly connected to the surfaces of the end plates opposed to each other of adjacent two battery modules, and the battery pack further comprises a tray, the battery modules are set on an upper surface of the tray, while the connecting assembly is spaced apart from the upper surface of the tray.

16. The battery pack according to claim 15, wherein, the elastic connecting member comprises a first elastic portion and a second elastic portion, the first elastic portion has a wedge-shaped longitudinal section and comprises a first side wall and a first inclined wall opposite to each other in the first direction, and the second elastic portion has a wedge-shaped longitudinal section and comprises a second side wall and a second inclined wall opposite to each other in the first direction, wherein the first inclined wall and the second inclined wall are matched with each other, and the first elastic portion and the second elastic portion are connected to each other by means of the first inclined wall and the second inclined wall.

\* \* \* \* \*